3,005,947
Patented Oct. 24, 1961

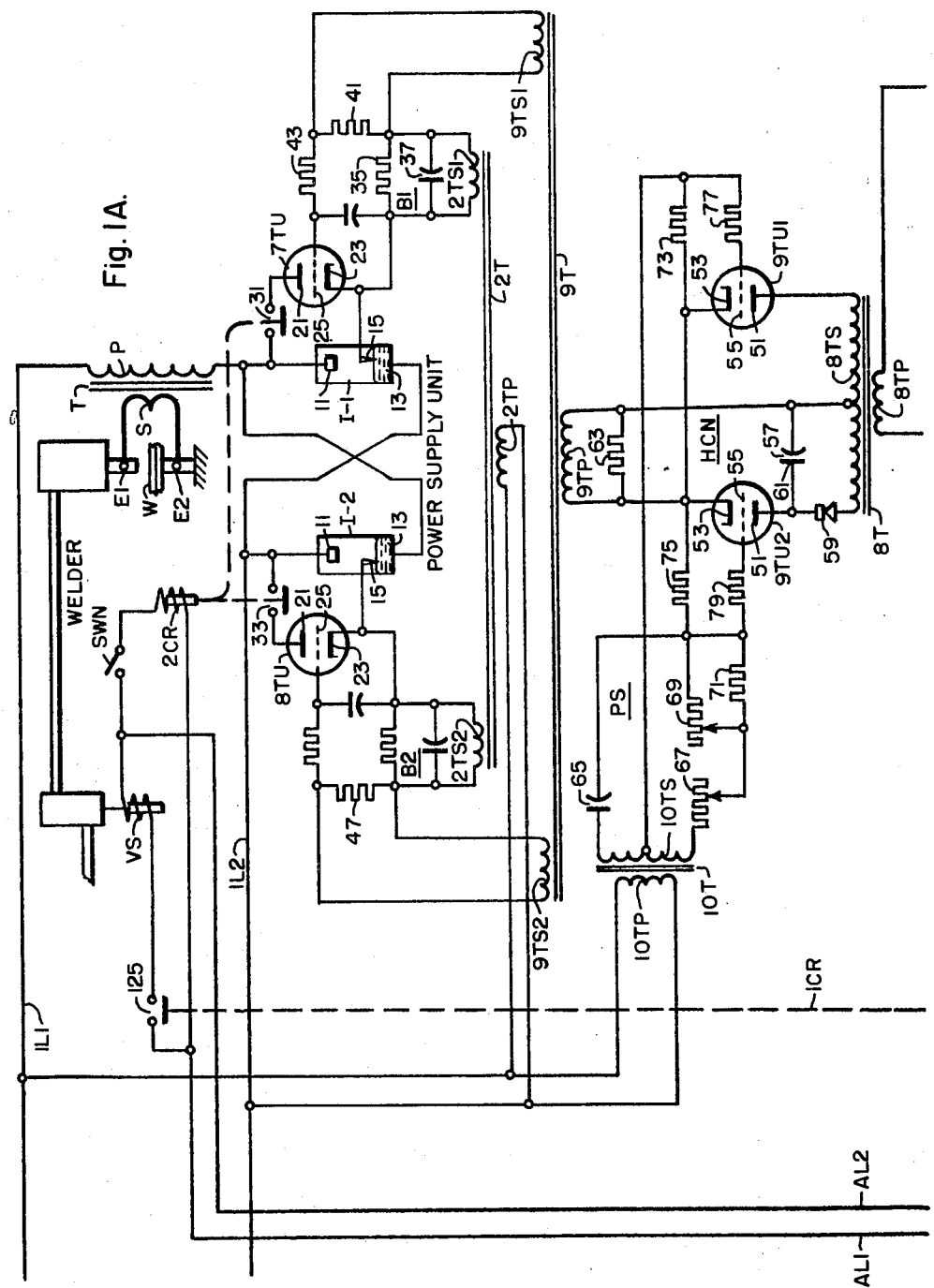
Fig. IA.

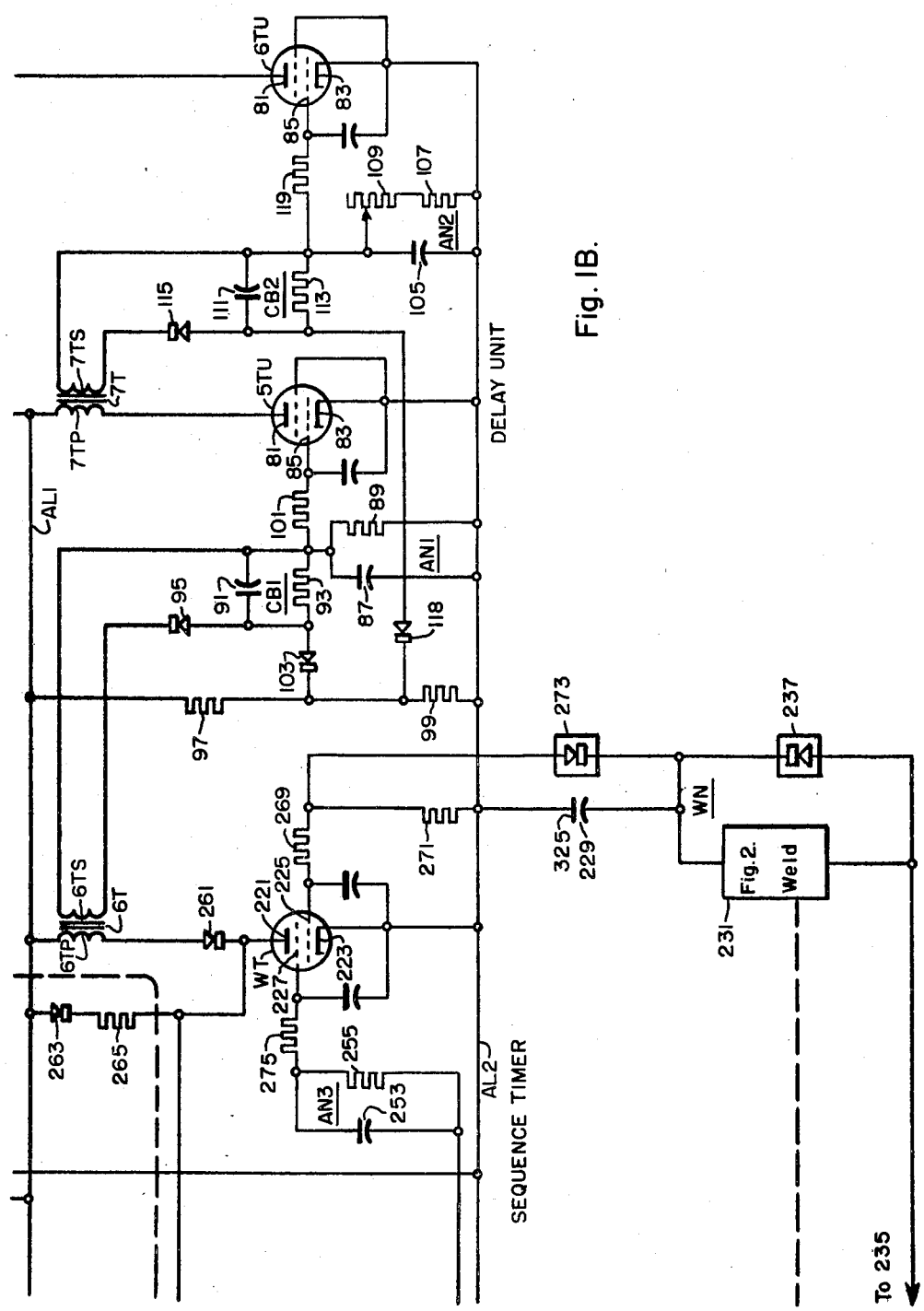
Fig. IB.

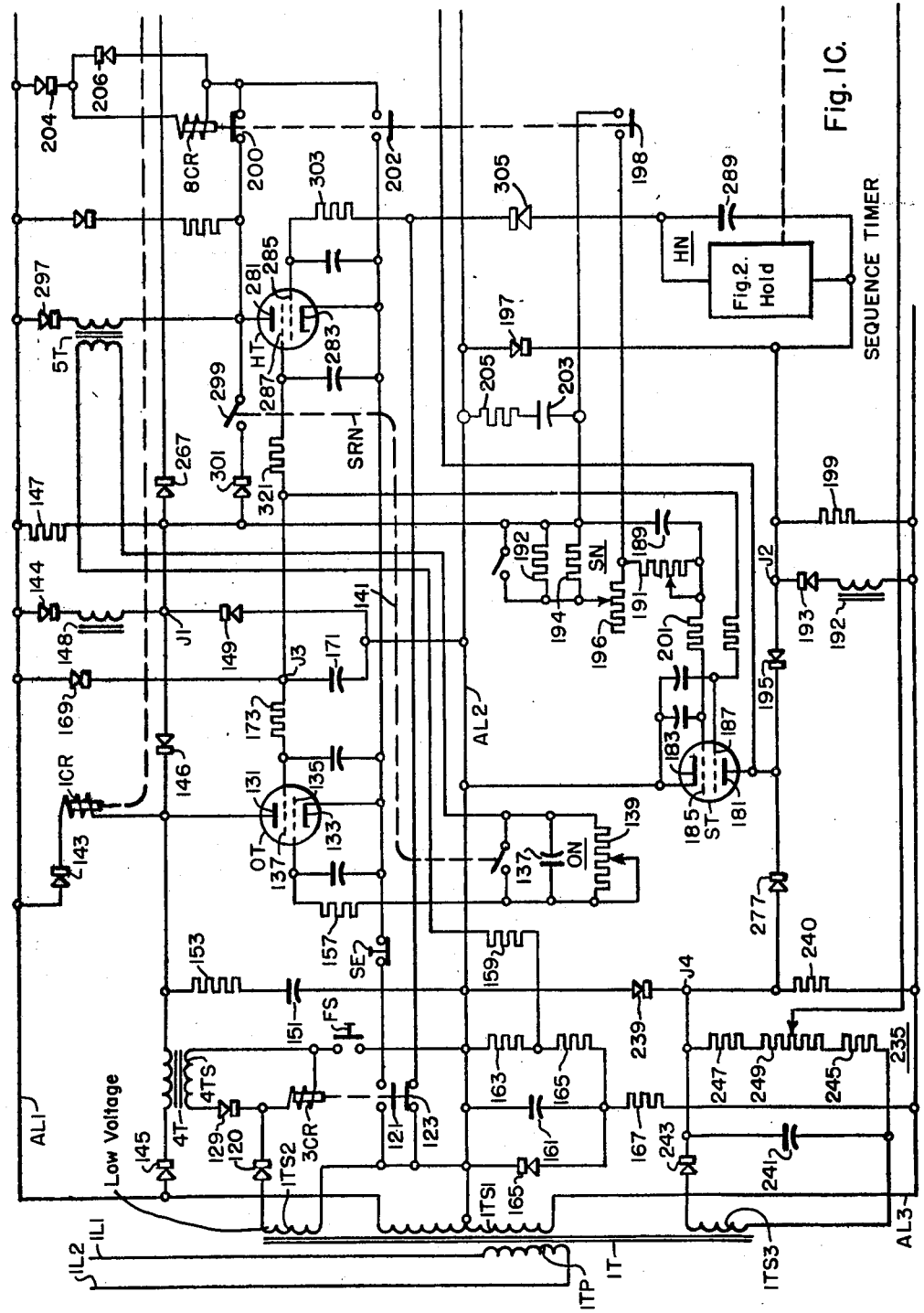

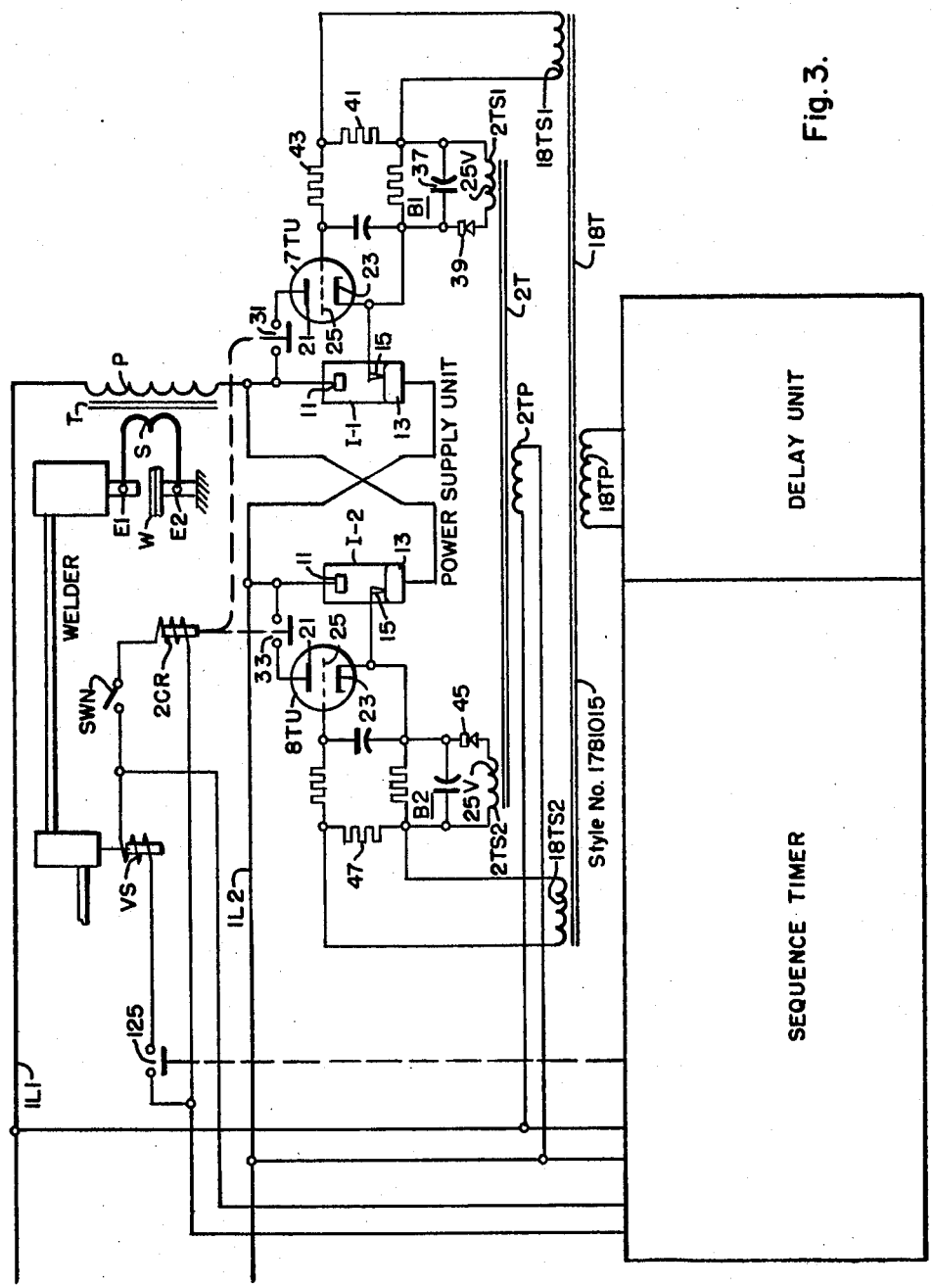

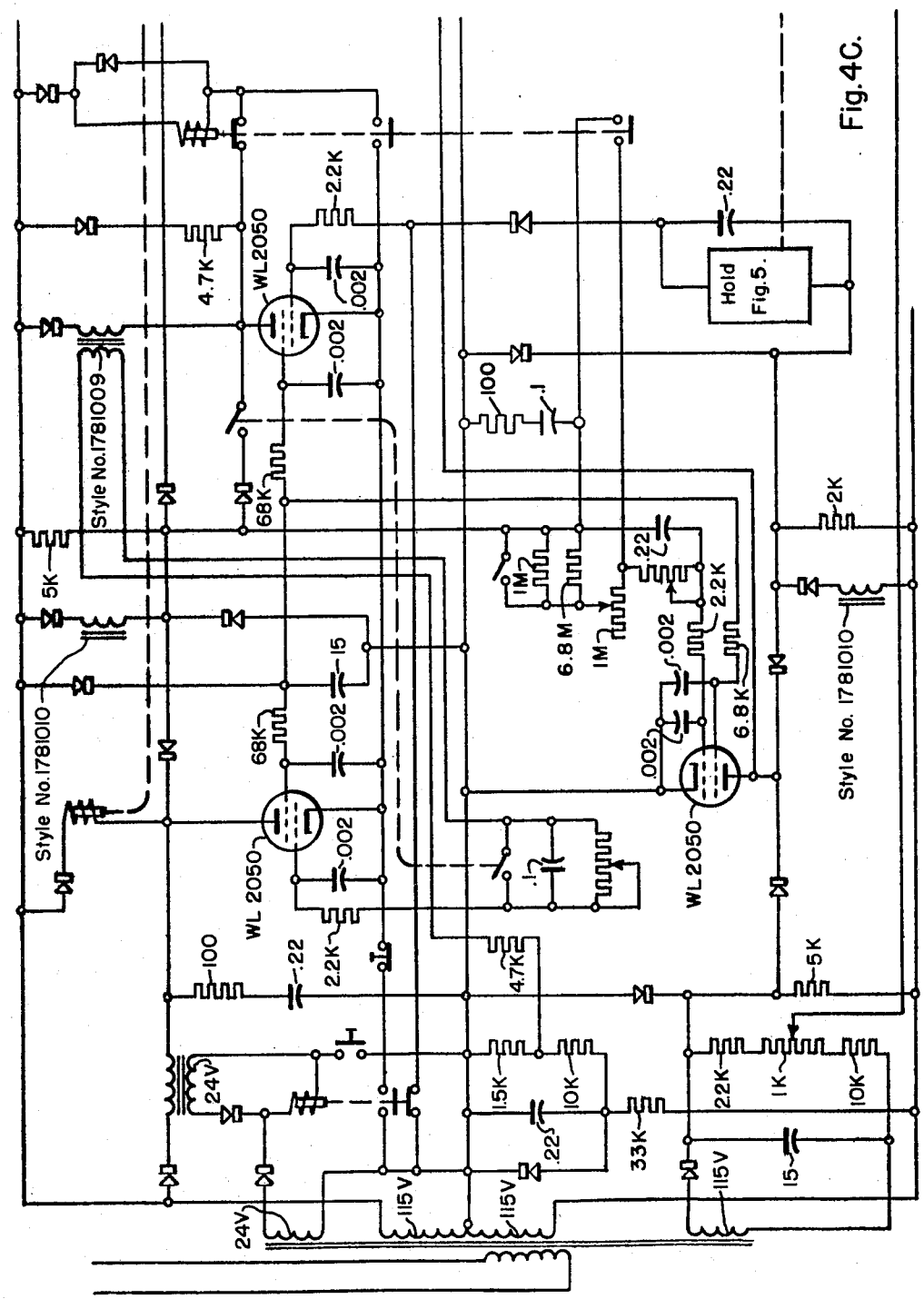

3,005,947
ELECTRIC DISCHARGE APPARATUS
Donald R. Scholtes, Virginia Beach, Va., and William E. Large, Clarence, N.Y., assignors to Westinghouse Electric Corporation, East Pittsburgh, Pa., a corporation of Pennsylvania
Filed July 31, 1957, Ser. No. 675,306
18 Claims. (Cl. 323—58)

This invention relates to electric discharge apparatus and has particular relation to discharge apparatus for controlling resistance welding. This application is an outgrowth of experience with application Serial No. 490,871, filed February 28, 1955, to Hubert W. Van Ness and William E. Large and Patent No. 2,888,550, granted May 26, 1959, to Hubert W. Van Ness. This Van Ness et al. application and the Van Ness patent are incorporated herein by reference.

In their specific aspects the Van Ness et al. application and Van Ness patent identified above relate to control apparatus for high speed resistance welding which includes fail-safe facilities for preventing the welding apparatus from continuing to operate on the failure of one of the critical discharge devices of the sequence timer. One of the features of this invention in its specific aspects arises from the demand of the welding industry that the becoming effective of such facilities must not depend on the conduction of a discharge device and it is accordingly an object of this invention to provide apparatus which shall fail-safe on the failure of a critical discharge device of the sequence timer and the fail-safe operation of which shall not depend on the conduction of a discharge device.

The apparatus disclosed in the Van Ness et al. application and the Van Ness patent has been found to operate highly satisfactorily in practice both for low speed and for high speed welding. But this apparatus is highly complex and because of complexity is costly to manufacture and costly to install and maintain.

It is accordingly an object of this invention to provide control apparatus for high speed welding of relatively simple and low cost structure.

An incidental object of this invention is to provide a novel electronic circuit particularly suitable for use in apparatus for the control of welding the fail-safe operation of which shall not depend on the conduction of a discharge device.

Another incidental object of this invention is to provide a novel electronic circuit particularly suitable for the control of the supply of the alternating current from a source to a load such as a welding transformer through electric discharge devices connected in anti-parallel.

A further incidental object of this invention is to provide a novel heat control circuit for electric resistance welding apparatus.

Still another incidental object of this invention is to provide a novel electronic circuit particularly suitable for use in heat control of electric resistance welding apparatus.

In accordance with one aspect of this invention, a sequence timer is provided which includes a discharge device for timing the welding interval that is conducting during the welding interval and becomes non-conducting at the end of the welding interval. So long as this device conducts, it triggers the conduction of the discharge devices that conduct the welding current. When this device fails to conduct the discharge devices which conduct the welding current are not rendered conducting and the flow of welding current is interrupted. Thus the failure of this device positively stops the flow of welding current.

The heart of this aspect of the invention is a novel electronic circuit including the critical discharge device which times the welding current and which may be called the weld thyratron. This device is preferably a thyratron having an anode, a cathode and a pair of control electrodes. One of the control electrodes is connected to the cathode through a resistor so that in the absence of current through the resistor the potential of this one control electrode is zero relative to the cathode and the thyratron would conduct unless blocked by the other control electrode. In the standby condition of the apparatus conduction is blocked by a time-constant network between the other control electrode and the cathode which is charged negative and which preferably has a short timing interval. A second time-constant network is connected to the first control electrode. This network may be charged to either polarity. When charged to one polarity this network cannot transmit current through the resistor and the thyratron is permitted to conduct; when charged to the opposite polarity this network transmits current through the resistor to block the thyratron. This second network is originally charged to the first polarity. It discharges when the first network times out and the weld interval timed by the thyratron is the interval during which this second network discharges and reverses its charge to block the thyratron.

Another aspect of this invention involves a simplified heat control circuit which is triggered during each period by the current conducted by the weld thyratron. This heat control circuit includes a pair of discharge paths which may be sections of a double triode. These paths are connected to the weld thyratron through a transformer which is so poled that the anode potential for one path is supplied directly by each half-cycle of current transmitted through the thyratron and the anode potential for the other path is supplied by the potential produced by the decay of the current in the transformer during the succeeding half period of the supply when the conduction of the weld thyratron is decaying. The two paths are controlled from a phase-shift network which may be set to permit the paths to conduct at any desired instant in the half periods of supply. The weld thyratron conducts during the half periods of the weld interval during which its anode-cathode potential is positive and its conduction carries over into the succeeding half periods. The first path may then be rendered conducting at any time during this interval depending on the setting of the phase shift network. The potential produced by the decay of the energy built up during each half period during which the conductivity of the weld thyratron decays persists only for part of the half period. But a capacitor is provided to retain the effect of this potential and the second path may be supplied directly from the potential produced by the decay of flux if the phase-shift network is set to render the second path conducting early in the half period or from the capacitor if the phase shift network is set to render the path conducting at an instant in the half period after the potential produced by the decay of flux has disappeared. The heat control network, including the two discharge paths, is coupled to render conducting the main discharge devices which conduct the welding current beginning at the instants when these paths conduct. The main discharge devices then conduct in accordance with the settings of the phase shift network.

In accordance with further specific aspects of this invention, a novel simplified control is also provided for apparatus which does not include heat control facilities. In addition in accordance with the specific aspects of this invention, the sequence timer includes a novel initial squeeze facility which operates to shunt out the initial squeeze impedance of the squeeze network at the end of the first hold interval and to maintain this impedance shunted out thereafter during succeeding welding cycles.

The novel features considered characteristic of this invention are disclosed generally above. The invention itself both as to its origination and as to its method of operation together with additional objects and advantages thereof will be understood from the following description of specific embodiments when read in connection with the accompanying drawings, in which:

FIGURES 1A through 1C together constitute a circuit diagram of a preferred embodiment of this invention.

FIG. 3 is a circuit diagram showing a modification of this invention;

FIGS. 4A through 4C are circuit diagrams similar to FIG. 1 but showing the component magnitudes of a system in accordance with FIG. 1 which has been constructed and found to operate highly satisfactorily.

FIGS. 4A through 4C and FIG. 5 are included herein for the purpose of aiding those skilled in the art in the practice of this invention and not with any intention of limiting the scope of this invention. FIG. 5 shows the component magnitudes for the hold and weld networks; the component magnitudes for the squeeze and off networks are generally similar.

*Description—FIGS. 1A through 1C*

Figure 2:
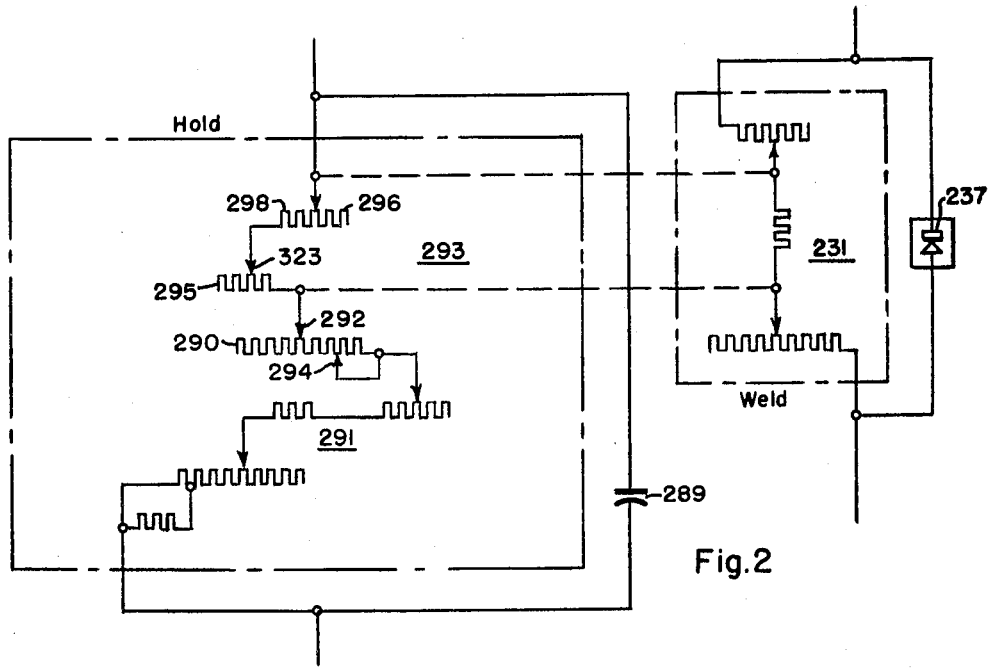
FIG. 2 is a circuit diagram showing the relationship between the weld and hold timing impedances in accordance with this invention.
Figure 5:
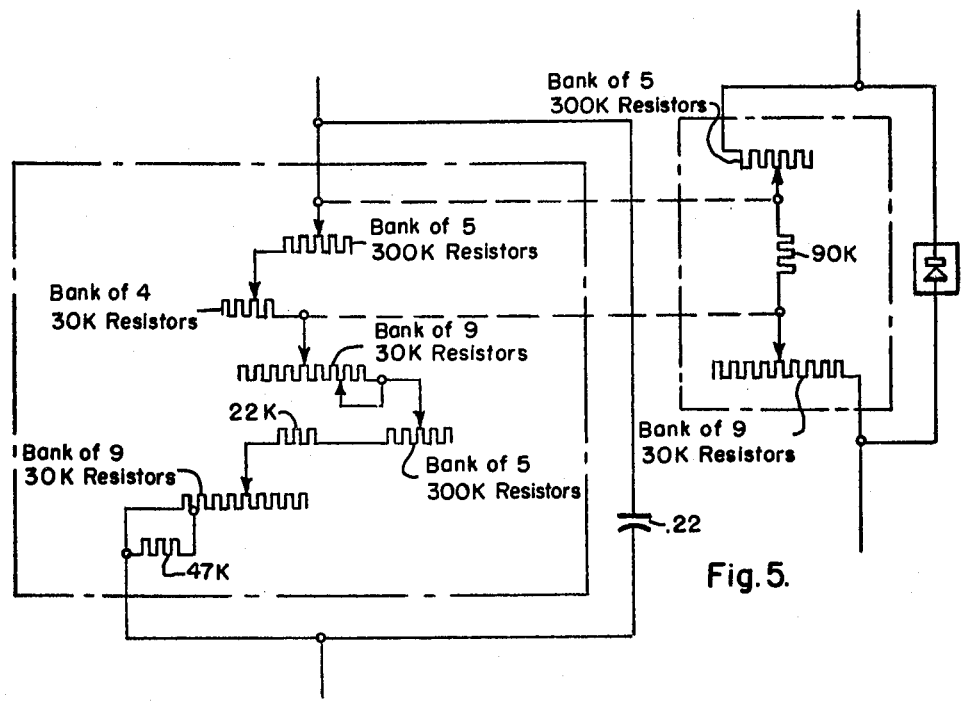
FIG. 5 is a circuit diagram similar to FIG. 2 but showing component magnitudes of a satisfactory system.
Figure 4A:
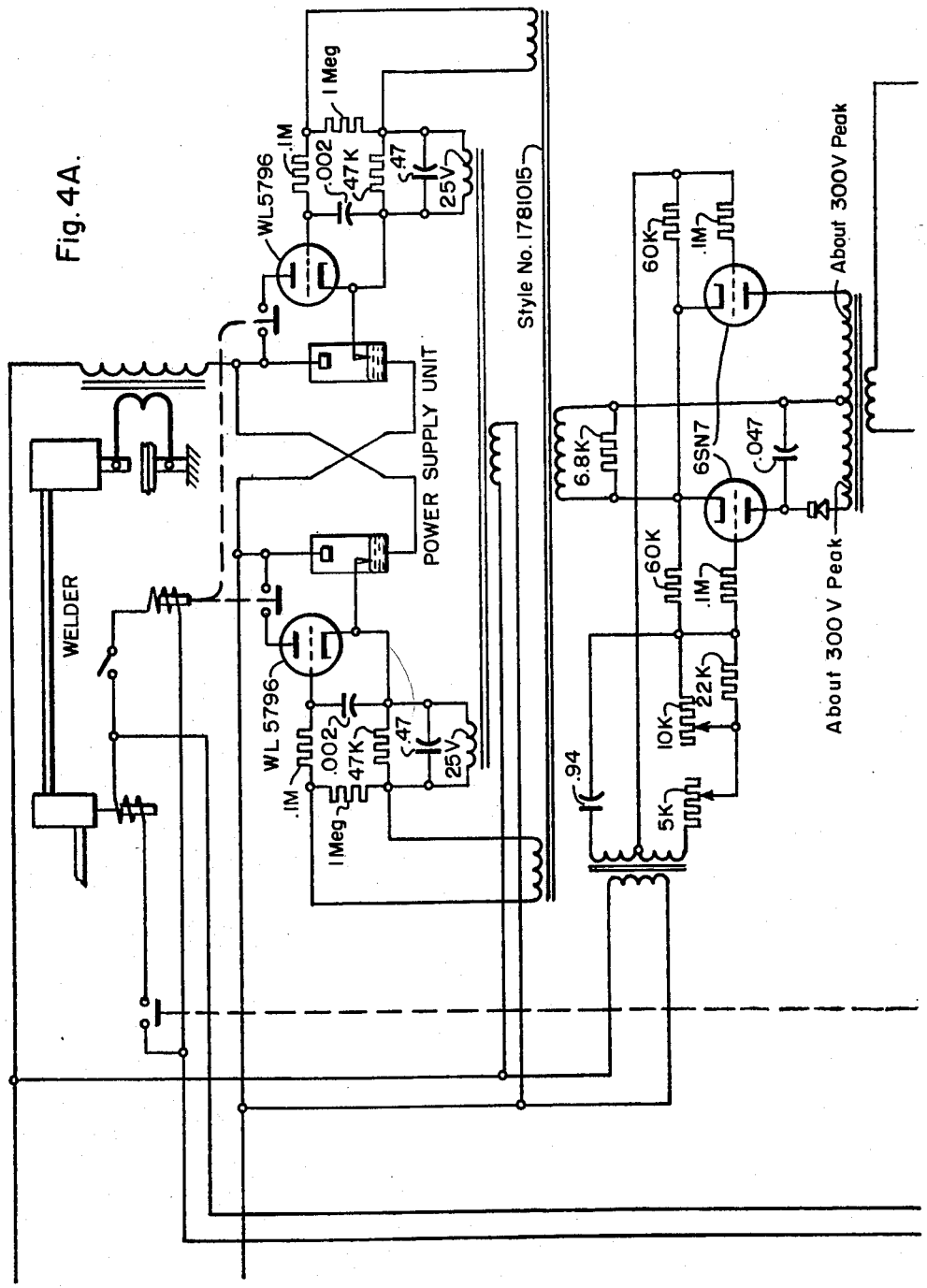
Figure 4B:
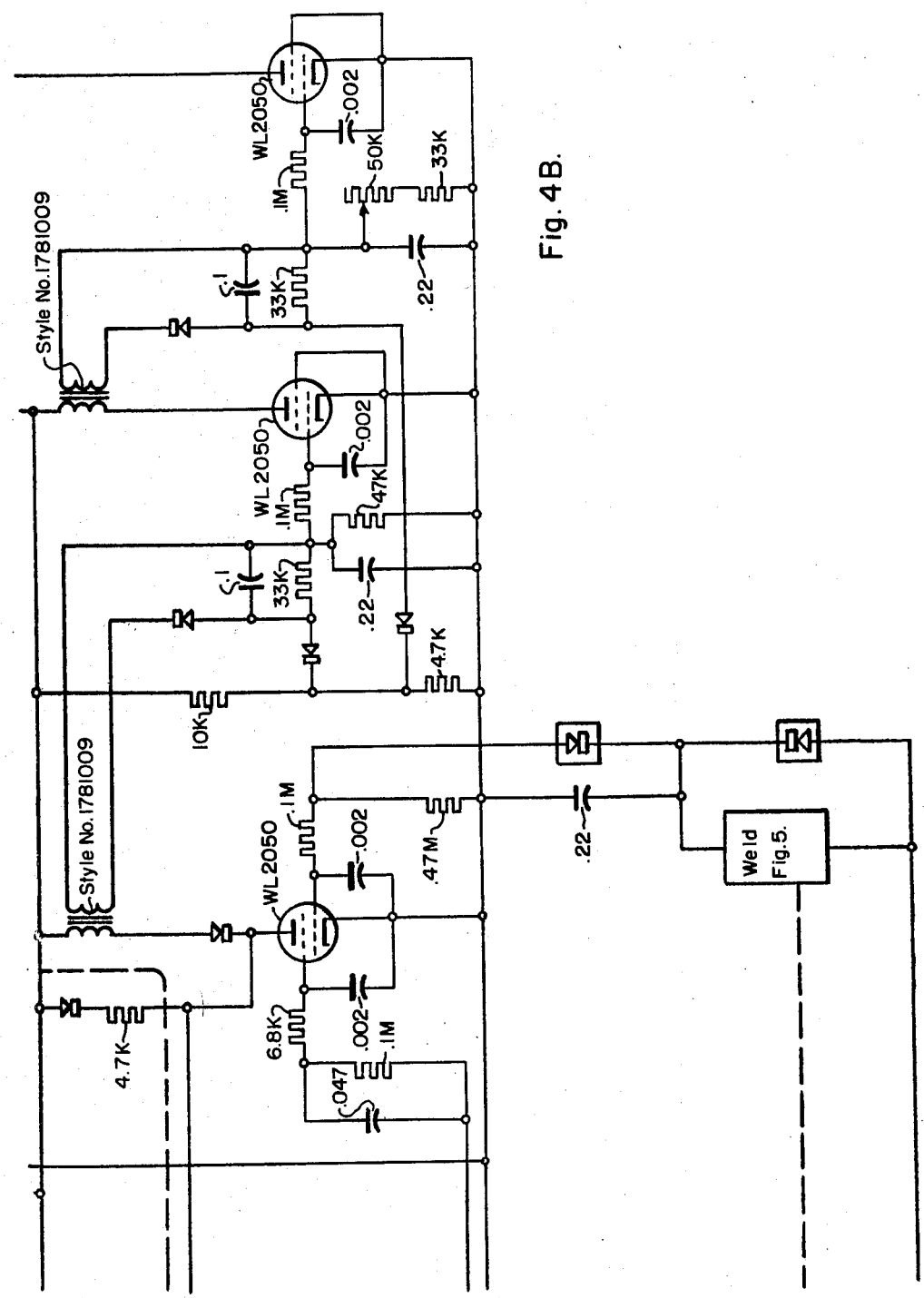

The apparatus shown in FIG. 1 includes a Welder, a Power Supply Unit, a Delay Unit and a Sequence Timer. The Delay Unit introduces a delay between the signal which triggers the welding impulse and the actual flow of welding current. This apparatus is supplied from main buses 1L1 and 1L2 which may be energized from the usual commercial 230 or 440 volt supply through circuit breakers, fuses or disconnects (not shown). For the purpose of energizing the Sequence Timer and the Delay Unit, auxiliary conductors AL1, AL2 and AL3 are provided. These conductors derive their power from the secondary 1TS of a transformer 1T, the primary 1TP of which it is energized from the conductors 1L1 and 1L2. The secondary 1TS has end terminals and an intermediate terminal. Conductors AL1 and AL3 are connected to the end terminals and conductors AL2 to the intermediate terminal. The phase of the potential between AL1 and AL2 is then opposite to the phase of the potential between AL3 and AL2.

The Welder includes a welding transformer T having a primary P and a secondary S. Welding electrodes E1 and E2 are connected across the secondary. Electrode E1 may be movable so that it may be engaged and disengaged with the work W to be welded. The Welder includes the other facilities usually included in such apparatus such as the fluid pressure unit for actuating the electrodes, a valve (not shown) for controlling this unit and back pressure switches (not shown) which are closed when the pressure between the electrodes E1 and E2 and the work W is adequate. The valve is controlled by a solenoid VS and is opened when this solenoid is energized.

The Power Supply Unit includes a pair of ignittrons I–1 and I–2 each having an anode 11, a cathode 13 and an ignitor 15. A firing thyratron 7TU and 8TU is associated with each of the ignitrons I–1 and I–2 respectively. Each firing thyratron has an anode 21, a cathode 23 and a control electrode 25. The anode 21 of each of the thyratrons 7TU and 8TU is adapted to be connected to the anode 11 of the associated ignitron I–1 and I–2 through the normally open contacts 31 and 33 of a weld-no-weld relay 2CR. The cathode 23 of each of the thyratrons 7TU and 8TU is directly connected to the ignitor 15 of the associated ignitrons I–1 and I–2.

The control circuit of 7TU includes a blocking biasing network B1 including a capacitor 35 in parallel with a resistor 37 supplied from the secondary 2TS1 of transformer 2T through a rectifier 3T. The blocking bias may be counteracted by potential from the secondary 9TS1 of transformer 9T impressed across a resistor 41. The biasing network B1 and the resistor 41 are connected between the control electrode 25 and the cathode 23 of 7TU through a grid resistor 43. Similarly the control circuit of thyratron 8TU includes a blocking biasing network B2 supplied through a rectifier 45 from secondary 2TS2, the blocking bias being counteracted by potential from secondary 9TS2 impressed across resistor 47.

The Power Supply Unit also includes a heat control network HCN which includes the discharge paths 9TU1 and 9TU2. These paths may be the anode-cathode paths of a double triode high vacuum tube. Each path 9TU1 and 9TU2 has an anode 51, a cathode 53, and a control electrode 55. The heat control unit HCN also includes a capacitor 57 and a rectifier 59. The paths 9TU1 and 9TU2 are supplied from a transformer 8T in the Delay Unit, which includes a primary 8TP and a secondary 8TS. The secondary has an intermediate terminal and end terminals.

The anode 51 of one of the paths 9TU1 is connected directly to one end terminal of the secondary 8TS. The cathodes 53 are connected together. The capacitor 57 is connected between the other terminal and the intermediate terminal through the rectifier 59. The rectifier 59 is so poled that the plate 61 of the capacitor electrically nearest the end terminal is charged positive. The anode 51 of the path 9TU2 is connected to this plate 61 of the capacitor. The primary 9TP is connected between the intermediate terminal and the cathode 55. A resistor 63 is connected in parallel with the primary 9TP.

The control circuit of discharge paths 9TU1 and 9TU2 includes a phase shift network PS. This network PS derives its power from the supply 1L1—1L2 through a transformer 10T and the secondary of which has an intermediate terminal and end terminals. A capacitor 65 and a plurality of resistors 67, 69 and 71 are connected between the end terminals, resistors 67 and 69 being variable and 71 being connected in parallel with 69. Between the intermediate terminal and the junction of the capacitor 65 and the resistors 67, 69 and 71 a potential is derivable from this network which is displaced in phase with reference to the potential impressed across the primary 10TP and thus with reference to the potential between conductors 1L1 and 1L2. The intermediate terminal of secondary 10TS and the junction of the capacitor 65 and the resistors is connected between a pair of resistors 73 and 75 in series and also through grid resistors 77 and 79 respective to a control electrode 55 of the paths 9TU1 and 9TU2. The junction of the resistors 73 and 75 is connected to the common connection of the cathodes 53 of 9TU1 and 9TU2. The phase shifted potential from PS is then impressed between the control electrodes 55 and the cathodes 53 of 9TU1 and 9TU2, the potential between one of these control electrodes and cathodes being in opposite phase of the potential between the other control electrode and cathode.

The Delay Unit includes a pair of thyratrons 5TU and 6TU each having an anode 81, a cathode 83, and a control electrode 85. The anode 81 of thyratron 5TU is connected to conductor AL1 through the primary 7TP of a transformer 7T. The cathode 83 is connected to conductor AL2. The anode 81 of 6TU is connected to conductor AL1 through the primary 8TP. The cathode is connected to conductor AL2. The control circuit of 5TU includes a time-constant network AN1 and a counter-biasing network CB1. The network AN1 includes a capacitor 87 shunted by a resistor 89. The capacitor 87 and resistor 89 are so related that when the capacitor 87 is charged and the charging is interrupted, the discharge of the capacitor through the resistor affords a timing interval of the order of several periods of the supply. The counter biasing network CB1 includes a capacitor 91 shunted by a resistor 93. This network has a time-constant of the order of a period of the supply and when the capacitor 91 is charged and the charging is interrupted the capacitor discharges through the resistor 93 so as to time an interval of the order of one period of the supply. The network CB1 is adapted to be charged through a rectifier 95 from a secondary 6TP of a transformer 6T which is in the Sequence Timer. Potential for charging the network AN1 is derivable from a voltage divider consisting of a pair of resistors 97 and 99 connected between conductors AL1 and AL2.

The control circuit of 5TU includes two branches, one consisting of a grid resistor 101 and the network AN1 and the other of the grid resistor 101, the network CB1, a rectifier 103 and the resistor 99. In the absence of potential on transformer 6T the network AN1 is charged through the rectifier 103 so as to prevent conduction of 5TU. During the operation of apparatus potential is supplied to transformer 6T to charge network CB1 to a potential such as to block further charging of AN1. AN1 then discharges and after AN1 has discharged for an interval of the order of a period of the supply 5TU is rendered conducting. That is 5TU fires the period following the firing of WT.

Thyratron 6TU also includes a time-constant network AN2 and a counter-biasing network CB2. Network AN2 includes a capacitor 105 shunted by a fixed resistor 107 and a variable resistor 109. Network CB2 includes a capacitor 111 shunted by a resistor 113. Network CB2 is adapted to be charged from the secondary 7TS of the transformer 7T through a rectifier 113. Network AN2 is adapted to be charged from the voltage divider 97–99 though a rectifier 118 and network CB2.

The control circuit of thyratron 6TU has two branches one including a grid resistor 119 and network AN2 and the other the grid resistor 119, network CB2, the rectifier 118 and the voltage divider resistor 99. In the absence of potential on transformer 7T, network AN2 is charged so as to prevent conduction of 6TU. When transformer 7T is energized a potential blocking the charging of AN2 is impressed on CB2. Network AN2 then discharges for an interval such as to permit 6TU to conduct a quarter period after the zero potential instant in the period following the one during which transformer 7T is energized. Network CB2 discharges in a time interval of the order of a period of the supply.

The Sequence Timer includes a plurality of thyratrons; an off thyratron OT, squeeze thyratron ST, weld thyratron WT and a hold thyratron HT. The Sequence Timer also includes a plurality of timing networks; an off network ON, a squeeze network SN, a weld network WN and a hold network HN. In addition the Sequence Timer includes an auxiliary network AN3. There is also an operator's start switch FS, a start relay 3CR and a relay 1CR for controlling the solenoid VS which applies the pressure to the electrodes E1 and E2.

The start switch FS is connected in series with a rectifier 120 and the coil of relay 3CR across a low voltage secondary 1TS2 of transformer 1T. This secondary supplies a potential of the order of 24 volts which is not dangerous for the operator. Across the coil of the relay 3CR the secondary 4TS of the transformer 4T is connected through a rectifier 129. The relay 3CR may thus be supplied independently of the foot switch FS from the secondary of transformer 4T once the latter is energized.

The relay 3CR has a normally open contact 121 and a normally closed contact 123. The relay 1CR has a normally open contact 125.

The thyratron OT has an anode 131, a cathode 133, a first control electrode 135 and a second control electrode 137. The network ON has a capacitor 137 shunted by a bank of resistors 139 which may be in turn shunted out by a switch 141 when the apparatus is set for non-repeat operation. The anode 131 of thyratron OT is connected to conductor AL1 through the coils of relay 1CR and through a rectifier 143 poled to conduct positive current from the conductor AL1 to the anode. The anode 131 of thyratron OT is also connected to conductor AL1 through the primary 4TP of transformer 4T and a rectifier 145 poled to conduct positive current from conductor AL1 to the anode. The anode 131 is also connected through a rectifier 146 to the junction J1 of a resistor 147 and rectifier 149 connected between AL1 and AL2 with the rectifier poled to conduct positive current from AL2. A rectifier 144 and an inductive reactor 148 are also connected to the junction J1.

The cathode 133 of the thyratron OT is adapted to be connected to conductor AL2 through a normally closed emergency stop switch SE and the contact 121 of relay 3CR. Between the anode 131 and conductor AL2 there is in addition connected a phase shift network PS1 including a capacitor 151 and a resistor 153 in series. The effect of this network PS1 is to introduce a phase lag in the potential impressed between the anode 131 and cathode 133, which causes the anode-cathode potential to become positive a short time of the order of 25 or 30 electrical degrees after the supply potential between AL1 and AL2 becomes positive.

The first control electrode 135 of thyratron OT is connected to the cathode through a grid resistor 157, the network ON, the secondary 5TS of a transformer 5T, a resistor 159, and a network for impressing ripple consisting of a capacitor 161 shunted by a pair of resistors 163 and 165 and also shunted by a rectifier 165. This network is connected through a resistor 167 between conductors AL3 and AL2 and impresses a positive potential in the control circuit.

The other control electrode 137 of OT is connected to the junction J3 of a rectifier 169 and a capacitor 171 through a grid resistor 173. The capacitor 171 and rectifier 169 are connected between conductors AL1 and AL2 and the capacitor 171 impresses a potential on the second control electrode 137 which has the effect of shifting the critical potential for the first control electrode 135 to more negative magnitude and thus to improve the reliability of the firing of the thyratron OT.

The squeeze thyratron ST has an anode 181, a cathode 183, a first control electrode 185 and a second control electrode 187. The squeeze network SN includes a capacitor 189 having a bank of resistors 191 and an additional resistance for timing the squeeze time of the first weld of a series of welds connected in parallel therewith. This resistance produces the so-called initial squeeze timing and includes fixed resistors 192 and 194 in series with a variable resistor 196. This resistance may be shunted out by a contact 198 of a relay 8CR. The relay 8CR has in addition a normally closed and another normally open contact 200 and 202, respectively.

The coil of relay 8CR is connected between conductor AL1 and the anode 281 of the hold thyratron HT through a rectifier 204 poled to conduct positive current from conductor AL1 to the anode. Another rectifier 206 is connected in parallel with the coil so as to maintain the current flow therethrough during the negative half period following the one during which current is conducted therethrough. The coil of relay 8CR is also adapted to be connected between conductor AL1 and conductor AL2 through normally open contact 202 of the relay 8CR and the normally closed contact 200 of the relay 8CR. When the relay is actuated, the normally open contact 202 in this circuit is closed before the relay can drop out in spite of the fact that the normally closed contact 200 has been opened.

The anode 181 of thyratron ST is connected to conductor AL3 through an inductive reactor 192 and a pair of rectifiers 193 and 195 poled to conduct positive current from the conductor AL3 to the anode 181. The anode 181 is also connected through one of the rectifiers 195 to the junction J2 of a rectifier 197 and a resistor 199 connected between conductors AL3 and AL2 with the last-mentioned rectifier 197 poled to conduct positive current from conductor AL2 to conductor AL3.

The first control electrode 185 of the thyratron ST is connected to the cathode 183 through a grid resistor 201, the network SN and a network consisting of a capacitor 203 and a resistor 205 connected in series.

The network SN is connected to the junction J1. The capacitor 203 and the resistor 205 in series between the squeeze network and conductor AL2 are for the purpose of suppressing irregular variations in the arc-drop from affecting the control of thyratron ST. The capacitor 203 between the squeeze network SN and conductor AL2 retains the effect of the maximum arc-drop potential regardless of any decrease in the arc-drop near the end of the conducting interval. The second control electrode 187 of thyratron ST is connected to the junction J3 of the positive biasing capacitor 171 and the rectifier 169.

The weld thyratron WT includes an anode 221, a cathode 223, a first control electrode 225 and a second electrode 227. The weld network WN includes a capacitor 229, a bank 231 of resistors, an auxiliary power supply 235 and a rectifier 237. The auxiliary power supply is derived from a capacitor 241 which is charged from the second 1TS3 of transformer 1T through a rectifier 243. Across the capacitor 241 a pair of fixed resistors 245 and 247 and variable resistor 249 are connected in series. The variable resistor 249 is set to derive a predetermined potential. The weld network includes in series the capacitor 229, the banks 231 of resistors, the variable resistor 249 and fixed resistor 247. The return path for this network to capacitor 229 is through rectifier 277 and thyratron ST. The rectifier 237 is of the type having a very high back resistance such as a silicon rectifier and is connected in parallel with the banks 231 of resistors. The latter rectifier is poled to conduct oppositely to the potential from the auxiliary power supply. The network WN is connected to the junction J4 of a rectifier 239 and a resistor 240 connected between conductors AL3 and AL2 with the rectifier 239 poled to conduct positive current from conductor AL2 to conductor AL3. The network AN3 includes a capacitor 251 shunted by a resistor 253.

The anode 221 of thyratron WT is connected to conductor AL1 through the primary 6TP of transformer 6T and a rectifier 261 poled to conduct positive current from AL1 to the anode. The anode 221 is also connected to conductor AL1 through a rectifier 263 poled to conduct positive current from the conductor AL1 to the anode and a resistor 265. Further the anode 221 is connected to junction J1 through a rectifier 267 poled to conduct positive current from the junction to the anode. The cathode 223 of thyratron WT is connected directly to conductor AL2.

The first control electrode 225 of WT is connected to conductor AL2 (the cathode 223) through a grid resistor 269 and a resistor 271. The capacitor 229 of the weld network WN and a high back-resistance rectifier 273 are connected across resistor 271. The second control electrode 227 is connected to the anode 181 of thyratron ST through a grid resistor 275 and network AN3. The junction J4 is connected to the anode 181 through a rectifier 277 poled to conduct positive current from J4 to the anode.

The hold thyratron HT includes an anode 281, a cathode 283, a first control electrode 285, and a second control electrode 287. The hold network includes a capacitor 289 shunted by a plurality of banks 291, 293, 295 of resistors (FIG. 2). The time of discharge of the hold time capacitor 289 is determined by the sum of the resistors 291, 293 and 295. Resistors 293 are set in tandem with the resistors 231 of network WN and produce the same time of discharge as is produced by 231. Resistors 291 are set to add additional time. Since networks HN and WN start to time out simultaneously the setting of resistors 291 is the actual hold time when this hold time is positive. When the weld time is short and is set to be timed only by the fine timing resistors corresponding to resistors 290, the negative hold time is achieved partly by the timing of networks AN1 and AN2 (two periods) and partly by shorting out some of the resistors set by the tandem contact 292 with a negative hold shorting contact 294. The bank of resistors 295 serves for long timing. These resistors and one of the resistors 293 of the coarse bank 296 together equal one step of the coarse bank of the weld network. When the weld time is long and is set by resistors 296 the negative hold time is achieved by shorting out certain of the resistors 295 with a negative hold shorting contact 323. When the hold time is negative, resistors 291 are shunted out and resistors 295 are set so that the hold time times out by the desired number of periods before the actual welding stops.

The anode 281 of the hold thyratron HT is connected to conductor AL1 through a rectifier 297 and the primary 5TP of transformer 5T. The rectifier 297 is poled to conduct positive current from the conductor AL1 to the anode. The anode 281 of HT is also adapted to be connected to the junction J1 through a contact 299 of the repeat non-repeat switch SRN and a rectifier 301 when the switch is set for non-repeat operation. The rectifier is poled to conduct positive current from the junction J1 to the anode 281. The cathode 283 is adapted to be connected to the conductor AL2 through switch SE and contact 121.

The first control electrode 285 is connected to junction J2 through a grid resistor 303 and the hold network HN. This network HN is connected to be charged independently of thyratron HT through a rectifier 305 and normally closed contact 123 of relay 3CR. The second control electrode 285 is connected to junction J3 through a grid resistor 321.

*Standby—Figure 1*

In the standby condition of the apparatus, the conductors 1L1 and 1L2 and AL1 and AL2 and AL3 are energized. But the start switch FS is open so that relay 3CR is deenergized and its normally open contact open and its normally closed contact is closed. Since the contact of 3CR is open, thyratrons OT and HT are non-conducting. Since thyratron OT is non-conducting, the capacitor 189 of the squeeze network SN is charged in a circuit extending from junction J1 through the capacitor 189, the grid resistor 201, the first control electrode 185 and cathode 183 of thyratron ST to conductor AL2. The charge of the squeeze network SN is such as to maintain thyratron ST non-conducting in spite of the positive potential impressed at junction J3 on its second control electrode 187. The capacitor 289 of the hold network HN is charged in a circuit extending from J2 through the capacitor 289, a rectifier 305 normally closed contact 123 of relay 3CR to conductor AL2. Further the potential impressed on junction J4 from conductor AL3 is higher than the potential derivable from the auxiliary supply and the capacitor 229 of the weld network WN is charged in a circuit extending from J4 through fixed resistor 247, the variable resistor 249, the high back-resistance rectifier 237, the capacitor 229 to conductor AL2. This charge is such that the rectifier 273 opposes the discharge of the capacitor. Network AN3 is charged from J2 through a rectifier 195, the network, the grid resistor 274, second control electrode 227 and the cathode of WT. Network AN3 is charged so as to prevent conduction of WT in spite of the fact that its first control electrode 225 is substantially at the potential of its cathode 223 during standby.

Since thyratron HT is non-conducting transformer 5T is deenergized and the off network ON is uncharged. Thyratron OT may then conduct immediately at application of anode potential to it.

Since thyratron WT is non-conducting transformer 6T is deenergized; thyratron 5TU is then non-conducting, and transformer 7T is deenergized, thyratron 6TU is then non-conducting and transformer 8T is deenergized, discharge paths 9TU1 and 9TU2 are then deenergized so that thyratrons 7TU and 8TU and ignitrons I–1 and I–2 would be non-conducting, even if relay 2CR were actuated.

Operation—Figure 1
Repeat

In explaining the operation let it be assumed that the apparatus is set for repeat high-speed welding. Under such circumstances the resistors 290 or 295 in the hold network HN are set for the number of negative hold cycles. If the weld time is short and the negative hold interval is to be four cycles, two of the resistors of bank 290 is shorted out by the arm 294. If the weld time is long and the negative hold is to be four cycles, the contact 323 connected to these resistors is so set that all of the resistors are shunted out. For a negative hold of less periods than four correspondingly less resistors of the banks 290 or 295 are shunted out.

When a welding operation is to be carried out the weld-no-weld switch SWN is closed actuating relay 2CR. The contacts 31 and 33 of relay 2CR between the anodes of ignitrons I–1 and I–2 and the anodes of associated thyratron 7TU and 8TU are then closed. The work W is then placed on electrode E2 and the start switch FS is closed. Relay 3CR is then actuated closing the normally open contact 121 and opening its normally closed contact 123.

The closing of contact 121 connects the cathodes 133 and 283 of OT and HT to conductor AL2. The opening of the normally closed contact does not affect the charge on the hold network HN since cathode 283 of thyratron HT is now connected to conductor AL2 through the now closed contact 121 of relay 3CR. Thyratron HT remains blocked by charged network HN.

Since the cathode 133 of thyratron OT is connected to the conductor AL2 the latter is rendered conducting supplying current through the coil of the relay 1CR. The normally open contact 125 of the relay 1CR is now closed energizing the solenoid PS so that electrode E1 engages with the work W under pressure. In addition the current flow through the coil of the relay 1CR applies a potential across primary 4TP so that so long as relay 1CR is energized there is potential across 4TS to maintain the coil of relay 3CR energized. Relay 3CR cannot be de-energized unless thyratron OT is deenergized. That is once a complete welding cycle is started by the rendering conducting of thyratron OT this cycle is completed regardless of whether or not the operator switch FS is opened before the end of the cycles.

The rendering conducting of thyratron OT reduces the potential at the junction J1 and the squeeze network times out. The timing out interval during the first welding cycle of this operation is long since the squeeze network SN includes the initial squeeze resistances 192, 194 and 196. This affords adequate time for the electrode E1 to move from its remote position to engagement with the work W.

On the timing out of squeeze network SN the squeeze thyratron is rendered conducting. The squeeze thyratron is rendered conducting at the beginning of a half period because of the carry-over effect of the current flowing through the thyratron OT produced by the inductance in series with the anode and cathode of OT.

Unreliable firing of thyratron ST by reasons of variations in the arc-drop across the thyratron OT is prevented by the resistor 205 and the capacitor 203 in series with network SN and conductor AL2. The capacitor is charged to the maximum arc-drop potential and retains this charge until thyratron OT becomes non-conducting.

Once thyratron ST conducts, the potential at the junction J4 is reduced, and the bold network AN3 and the weld network start to time out. Network AN3 times out in a relatively short interval so that thyratron WT is capable of conducting during the half period following the first half period during which ST conducts. Since the first control electrode 225 of thyratron WT is at this time at the same potential as the cathode 223, this thyratron is conducting.

During the first period during which WT conducts, current flows through the primary 6TP energizing the secondary 6TS and impressing a potential on counter-biasing network CB1. This permits network AN1 to time out. Network AN1 times out for a time interval of one period of the supply. Thereafter thyratron 5TU conducts transmitting current through 7TP. This charges counter-biasing network CB2 permitting AN2 to discharge and 6TU to conduct. 6TU conducts beginning at an instant about a quarter period after the instant of zero potential in the first period following the one during which 5TU starts to conduct. A half cycle pulse then flows through 8TP energizing the anode circuit of 9TU1 and 9TU1 conducts either at the phase angle set by the network PS if this happens to be later than a quarter period or at the quarter period instant set by 6TU if network PS is set to fire earlier.

An important feature of this invention is the structure of transformer 8T (18T, FIG. 3). The primary 8TP conducts only half cycles of one polarity but the secondaries 8TS1 and 8TS2 conduct current of both polarity current of one polarity flowing while the primary conducts and current of opposite polarity being produced by the decay of flux built up in the core. The currents of opposite polarity during each period of the supply AL1—AL2 are of different amplitude and duration. The turns of the secondary sections of 8TS on the sides of intermediate tap are unbalanced to compensate for the difference in voltage. The transformer 8T has an airgap core. The specific transformer may be bought from Acme Electric Company under the designated catalogue No. T–30856.

The conduction of 9TU1 transmits current through 9TP energizing 9TS1, 7TU and the ignitron I–1 at the instant when 9TU1 conducts. During the succeeding half period the current produced by the decay of flux in transformer 8T is transmitted through the other half of the secondary 8TS. If PS is set to render 9TU2 conducting while potential produced by the decay of flux is still impressed on 8TS, 9TU2 is energized directly from the potential of 8TS; if PS is set to render 9TU2 conducting after the potential produced by the decay of flux has disappeared, 9TU2 is engaged by the potential on the capacitor 57 which was charged by the potential on 8TS. Current now again flows through 9TP this time energizing 8TU and ignitron I–2 and supplying current of the opposite polarity through the work W. Thus both I–1 and I–2 conduct when WT conducts during one half period.

Now WT conducts another half cycle of current and current is again transmitted through 6T. But now AN1 is discharged so that thyratron 5TU transmits current beginning at the beginning of its positive half period, and since AN2 is now discharged 6TU transmits current beginning at the beginning of the same half period. 9TU1 is now rendered conducting at the instant set by network PS and 9TU2 is correspondingly rendered conducting. Ignitrons I–1 and I–2 then conduct an additional full cycle of current.

Conduction of I–1 and I–2 thus continues so long as thyratron WT conducts during alternating half periods. As is explained in the earlier application, the late conduction of 6TU during the first half period prevents the saturation of the welding transformer T paricularly in situations where the latter has a core of highly magnetizable material such as a Hypersil steel.

While welding current is flowing through the welding transformer T and the work W the hold welder HN and the weld network WN are timing out. The hold network HN times out before the welding current stops flowing rendering HT conducting. One effect of the conduction of HT is to supply current to 5TP energizing the off network. Since the anode potential of thyratron OT lags in phase the potential between conductor AL1 and AL2 and therefore the anode potential of HT the off network ON is charged before the anode-cathode potential of thyratron OT becomes positive. During the same half period, then, during which HT conducts, OT is rendered non-conducting. If WT is still conducting when HT becomes non-conducting, the rendering non-conducting of OT does not affect the squeeze thyratron ST because the squeeze network SN is connected through rectifier 267 to the anode 221 of thyratron WT, and this thyratron is still conducting preventing the recharging of the squeeze network SN. The rendering non-conducting of the thyratron OT deenergizes relay 1CR in turn deenergizing the solenoid VS and permitting the electrode to be retracted from the work.

The conduction of thyratron HT also supplies current through the relay 8CR which is actuated to shunt out the initial squeeze resistances 192, 194 and 196 of the network SN and to connect the coil of the relay 8CR to the conductor AL2 through the now closed contact 202 of relay 8CR. Thus, the initial squeeze resistances now remain shunted out so long as the operators switch FS remains closed, and no longer affects the timing of the squeeze interval. The welding electrode E1 may now be returned to work only after it has been retracted a short distance.

While the sequence of operations starting with the timing out of network HN is taking place the weld network WN times out. On the timing out of the weld network WN the capacitor 229 is discharged to a magnitude smaller than the auxiliary potential. The auxiliary potential now causes current to flow from the junction J4 through the rectifier 277, the still conducting thyratron ST, the capacitor 229 of the weld network WN, the resistance 231 in the weld network to variable resistors 249. The capacitor is now charged with its plate 325 connected to resistor 271 positive and the other plate negative and current flows through the resistor 271 impressing a negative bias on the first control electrode 225 of thyratron WT. Thyratron WT is now rendered non-conducting, network AN1 is then charged from the voltage divider between conductors AL1 and AL2 to a potential such as to prevent thyratron 5TU from conducting. Since thyratron 5TU does not conduct, network AN2 is similarly charged preventing thyratron 6TU from conducting. 9TU1, 9TU2, 7TU, 8TU, I-1, and I-2 then remain non-conducting and the flow of current through the transformer T is interrupted.

In the meantime the rendering non-conducting of OT and WT permits the squeeze network SN to be recharged rendering ST non-conducting and this permits the charging of the hold and weld networks HN and WN and network AN3. The apparatus is now reset for a second operation, and if the switch FS remains closed the above-described welding cycle is repeated with the difference that the squeeze interval is very short. This welding cycle also may be repeated indefinitely until the switch FS is open. An opening of the switch does not instantaneously interrupt a welding cycle because relay 3CR remains energized from transformer 4T until thyratron OT becomes non-conducting.

*Operation—FIGURE 1*
*Non-repeat*

When the repeat non-repeat switch SRN is set for non-repeat the anode of thyratron HT is connected to the squeeze network SN through rectifier 301. Once HT is rendered conducting the squeeze network SN then remains charged independently of the conduction or non-conduction of OT and WT. Thus only one welding cycle can be carried out by each closure of switch FS. To repeat a welding cycle FS must be opened to permit 3CR to become deenergized in turn permitting HT to become deenergized. The deenergization of HT then permits resetting of the squeeze, weld and hold networks and network AN3.

*FIGURE 3*

The apparatus shown in FIG. 3 is similar to that shown in FIG. 1 except that it does not include the heat control features incorporated in paths 9TU1 and 9TU2. In this case the primary 18TP of transformer 18T is connected in the anode circuit of 6TU. This transformer has two secondaries 18TS1 and 18TS2 connected in the control circuits of the firing thyratrons 7TU and 8TU. During each half period during which 6TU conducts a pulse is transmitted through 18TP and potential is induced in 18TS1 counter-acting the bias B1. This renders 7TU and I-1 conducting. During the next half period potential is impressed across 18TS2 by reasons of the decay of flux in the core of transformer 18T. This potential is adequate to render 8TU conducting. I-2 is then rendered conducting to transmit current of the opposite polarity through work W. During each half period during which 6TU conducts a full cycle of current is then transmitted through the work W.

While preferred embodiments of this invention have been disclosed therein, many modifications thereof are feasible. This invention then should not be restricted except insofar as is necessitated by the spirit of the prior art.

We claim as our invention:

1. In combination first, second and third supply conductors, means connected to said conductors for impressing alternating potentials of opposite phase between said first and second and third and second conductors respectively, a first electric discharge device having an anode, a cathode, a first control electrode and a second control electrode, means for supplying a direct current potential having a magnitude substantially smaller than the amplitude of the alternating potential between said third conductor and said second conductor, a first time-constant network, including a capacitor and means for discharging said capacitor, a second time-constant network, means connecting said anode and cathode between said first conductor and said second conductor, with said cathode electrically nearest said second conductor, and said anode electrically nearest said first conductor, first rectifier means, second rectifier means, third rectifier means, means connecting in a first series circuit said third conductor, said second conductor, said capacitor, and said direct current potential and said first rectifier means with said first rectifier means poled to conduct positive current from said third conductor to said second conductor and said direct current potential opposing conduction through said first rectifier means, normally open switch means, means connecting said switch means between said third conductor and said second conductor so that when said switch means is closed it reduces the potential between said last-named conductors to a low amplitude substantially lower than the magnitude of said direct-current potential, said capacitor being charged to a first polarity when said switch means is open, resistance means connecting said first control electrode to said cathode, means connecting in a series network said capacitor, said resistance means and said third rectifier means with said third rectifier means poled to oppose potential of said first polarity so that when said first network is charged to said first polarity said device is maintained conducting, means connecting in a second series circuit said third conductor, said second network, said second rectifier, said second control electrode and said cathode, said second network being charged in said series circuit to a polarity tending to maintain said device non-conducting and means connecting in a third series network said direct current potential, said second rectifier means and said switch means with said second rectifier means poled to conduct current produced by said direct-current potential so that said first network is charged to a polarity opposite to said first polarity when said switch means is closed, whereby current is conducted through said resistance means and said third rectifier means and said devices rendered non-conducting.

2. In combination first, second and third supply conductors, means connected to said conductors for impressing alternating potentials of opposite phase between said first and second and third and second conductors respectively, a first electric discharge device having an anode, a cathode, a first control electrode and a second control electrode, means for supplying a direct current potential having a magnitude substantially smaller than the amplitude of the alternating potential between said third conductor and said second conductor, a first time-constant network having a capacitor and means for discharging said capacitor, a second time-constant network, means connecting said anode and cathode between said first conductor and said second conductor, with said cathode electrically nearest said second conductor and said anode electrically nearest said first conductor, first rectifier means, second rectifier means, third rectifier means, means connecting in a first series circuit said third conductor, said second conductor, said capacitor and said direct current potential and said first rectifier means with said first rectifier means poled to conduct positive current from said third conductor to said second conductor and said direct current potential opposing conduction through said first rectifier means, a second electric discharge device having an anode and a cathode, means connecting said anode and cathode of said second device between said third conductor and said second conductor so that when said second device is conducting it reduces the potential between said last-named conductors to a low amplitude substantially lower than the magnitude of said direct-current potential, said capacitor being charged to a first polarity when said second device is non-conducting, resistance means connecting said control electrode of said cathode, means connecting in a series circuit said capacitor, said resistance means and said third rectifier means, with said third rectifier means impressing potential of said first polarity, whereby said first device is capable of conducting when said capacitor is charged to said first polarity, means connecting in a second series circuit said third conductor, said second network, said second rectifier, said second control electrode and said cathode of said first device, said second network being charged in said series circuit to a polarity tending to maintain said first device non-conducting, means connecting in a third series network said direct current potential, said second rectifier means and said anode and cathode of said second device with said second rectifier means poled to conduct current produced by said direct-current potential so that said first network is charged to a polarity opposite to said first polarity when said second device is conducting, whereby said first device is prevented from being rendered conducting, and means connected to said second device for controlling the conductivity thereof.

3. In combination an electric discharge device having an anode, a cathode and a first control electrode, and a second control electrode, means connected to said anode and cathode for impressing an alternating potential therebetween, a first time-constant network, means connecting said first network to said first control electrode and said cathode, said first network when so connected permitting said device to conduct when charged to a first polarity and preventing said device from conducting when charged to a second polarity, means connecting said second network between said second control electrode and said cathode, means connected to said first network for charging said first network to said first polarity means connected to said second network for charging said second network to a potential maintaining said device non-conducting when said first network is charged to said first polarity, said first network when permitted to discharge, discharging in an interval a number of periods of said potential in duration and said second network when permitted to discharge, discharging in an interval of the order of one period of said potential in duration to a potential such as to permit said device to conduct, means to be actuated connected to said networks for starting the discharging of said networks simultaneously, and means connected to said first network and operable when said first network is substantially discharged for charging said first network to said second polarity.

4. In combination an electric discharge device having an anode, a cathode and a control electrode, a time constant network, means connected to said anode and cathode for impressing potential between said anode and cathode, means for impressing a first control potential, means for impressing a second control potential, said first control potential being of substantially higher magnitude than said second control potential, rectifier means, means connecting in a first series circuit said first control potential, said second control potential said network and said rectifier means, with said second control potential poled to oppose said first control potential and said rectifier means poled to oppose said second control potential, whereby said network is charged in said first series circuit by said first control potential to a first polarity, means connecting said network to said control electrode and said cathode so that when said network is charged to said first polarity it tends to render said device conducting, means connected to said first control-potential impressing means for reducing said first control potential to a magnitude lower than said second control potential, and means including said reducing means connecting in a second series circuit said network and said second control potential so that when said network is discharged it is charged through said reducing means to a potential of a second polarity opposite said second series circuit, said device being maintained non-conducting, when said network is at said second polarity.

5. In combination an electric discharge device having an anode, a cathode and a control electrode, a time constant network, means connected to said anode and cathode for impressing potential between said anode and cathode, means for impressing a first control potential, means for impressing a second control potential, said first control potential being of substantially higher magnitude than said second control potential, rectifier means, means connecting in a first series circuit said first control potential, said second control potential said network and said rectifier means, with said second control potential poled to oppose said first control potential and said rectifier means poled to oppose said second control potential, whereby said network is charged in said first series circuit by said first control potential to a first polarity, means connecting said network to said control electrode and said cathode so that when said network is charged to said first polarity it tends to render said device conducting, normally open switch means connected to said first control-potential impressing means when closed for reducing said first control potential to a magnitude lower than said second control potential, and means including said switch means when closed connecting in a second series circuit said network and said second control potential so that when said network is discharged it may be charged through said reducing means to a potential of a second polarity in said second series circuit, said device being maintained non-conducting at said second polarity.

6. Apparatus for controlling the supply of power from an alternating current source to a load comprising in combination a first electric discharge device, a second electric discharge device, each said device having an anode, a cathode and a control electrode, means connected to said anodes and cathodes for connecting said anodes and cathodes in antiparallel between said source and said load, first control means connected between said control electrode and said cathode of said first device for impressing a potential to maintain said first device non-conducting, second control means connected between said control electrode and said cathode of said second device for impressing a potential to maintain said second device non-conducting, a first electric discharge path, a second electric discharge path, each said path having an anode, a cathode and a control electrode, first means connecting said anode and cathode of said first path to said first control means so that when said first path is conducting a potential to render said first device conducting is impressed on said first control means, second means connecting the anode and cathode of said second path to said second control means so that when said second path is conducting a potential to render said second device conducting is impressed on said second means, a transformer having a primary and a secondary, said secondary having end terminals and an intermediate terminal, means connecting in a series circuit one of said end terminals, said intermediate terminal, said anode and said cathode of said first path and said first connecting means, with said last named anode electrically nearer said end terminal than said last named cathode, a capacitor, rectifier means, means connecting in a series circuit said other end terminal, said rectifier means, said capacitor and said intermediate terminal, said rectifier means being so poled that the plate of said capacitor electrically nearest said other end terminal is charged electrically positive when potential is impressed between said other terminal and said intermediate terminal, means connecting in a series circuit said anode and cathode of said second path, said capacitor and said second connecting means with said anode electrically nearer said plate than said cathode, means connected between said control electrode and cathode of said paths for impressing from said source between said control electrodes and cathodes respectively potentials displaced in phase with reference to the potential of said source by a selectively predeterminable angle, the last-named potential, impressed between one of said last-named control electrodes and cathodes being of opposite phase to the potential impressed between said other last-named control electrode and cathode, and means connected to said primary for transmitting therethrough from said source half cycles of current.

7. Apparatus for controlling the supply of power from an alternating current source to a load comprising in combination a first electric discharge device, a second electric discharge device, each said device having an anode, a cathode and a control electrode, means connected to said anodes and cathodes for connecting said anodes and cathodes in anti-parallel between said source and said load, a first transformer having a primary, a first secondary and a second secondary, first control means connected between said control electrode and said cathode of said first device and including said first secondary, said first device being rendered conducting on the impressing of a potential across said first secondary, second control means connected between said control electrode and said cathode of said second device and including said second secondary, said second device being rendered conducting on the impressing of a potential across said second secondary, a first electric discharge path, a second electric discharge path, each said path having an anode, a cathode and a control electrode, a second transformer having a primary and a secondary, said secondary having end terminals and an intermediate terminal, means connecting in a series circuit one of said end terminals, said intermediate terminal, said anode, said cathode, of said first path and said primary of said first transformer, with said last named anode electrically nearer said end terminal than said last named cathode, a capacitor, rectifier means, means connecting in a series circuit said other end terminal, said rectifier means, said capacitor and said intermediate terminal, said rectifier means being so poled that the plate of said capacitor electrically nearest said other end terminal is charged electrically positive when potential is impressed between said other terminal and said intermediate terminal, means connecting in a series circuit said anode and cathode of said second path, said capacitor and said primary of said first transformer with said anode electrically nearer said plate than said cathode, means connected between said control electrode and cathode of said paths for impressing from said source between said control electrodes and cathodes respectively potentials displaced in phase with reference to the potential of said source by a selectively predeterminable angle, the last-named potential impressed between one of said last-named control electrodes and cathodes being of opposite phase to the last-named potential impressed between said other last-named control electrode and cathode, and means connected to said primary of said second transformer for transmitting therethrough from said source half cycles of current.

8. Apparatus for controlling the supply of power from an alternating current source to a load comprising in combination a first electric discharge device, a second electric discharge device, each said device having an anode, a cathode and a control electrode, means connected to said anodes and cathodes for connecting said anodes and cathodes in anti-parallel between said source and said load, first control means connected between said control electrode and said cathode of said first device for impressing a potential to maintain said first device non-conducting, second control means connected between said control electrode and said cathode of said second device for impressing a potential to maintain said second device non-conducting, a first electric discharge path, a second electric discharge path, each said path having an anode, a cathode and a control electrode, first means connecting said anode and cathode of said first path to said first control means so that when said first path is conducting a potential to render said first device conducting is impressed on said first control means, second means connecting the anode and cathode of said second path to said second control means so that when said second path is conducting a potential to render said second device conducting is impressed on said second control means, a transformer having a primary and a secondary, said secondary having end terminals and an intermediate terminal, means connecting in a series circuit one of said end terminal, said intermediate terminal, said anode and said cathode of said first path and said first connecting means, with said last-named anode electrically nearer said end terminal than said last-named cathode, a capacitor, rectifier means, means connecting in a series circuit said other end terminals, said rectifier means, said capacitor and said intermediate terminal, said rectifier means being so poled that the plate of said capacitor electrically nearest said other end terminal is charged electrically positive when potential is impressed between said other terminal and said intermediate terminal, means connecting in a series circuit said anode and cathode of said second path, said capacitor and said second connecting means with said anode electrically nearer said plate than said cathode, means connected between said control electrode and cathode of said paths for impressing from said source between said control electrodes and cathodes respectively potentials displaced in phase with reference to the potential of said source by a selectively predeterminable angle, the last-named potential impressed between one of said last-named control electrodes and cathode being of opposite phase to the last-named potential impressed between said other last-named control electrode and cathode, an auxiliary electric discharge device having an anode and a cathode, means connected to said primary and said anode and cathode of said auxiliary device for connecting said source to said primary through said last-named anode and cathode, and means connected to said auxiliary device for rendering said auxiliary device conducting during a selectively predeterminable number of periods of said source.

9. In combination a first electric discharge path, a second electric discharge path, each said path having an anode, a cathode and a control electrode load means, a transformer, having a primary and a secondary, said secondary having end terminals and an intermediate terminal, a capacitor, a rectifier, means connecting in a series circuit one of said end terminals, said intermediate terminal, said anode and cathode of one path and said load means with said last-named anode electrically nearer said one end terminal than said cathode, means connecting in a series circuit said other end terminal, said intermediate terminal, said rectifier and said capacitor, the plate of said capacitor nearer said other end terminal being charged positive when potential is impressed on said transformer, means connecting in a series circuit said capacitor, said anode and cathode of said second path and said load means, with said last-named anode electrically nearer said plate than said last-named cathode, means connected to said primary for transmitted unidirectional current therethrough, and phase shift means connected between said control electrodes and said cathodes for impressing potentials of opposite phase between said control electrodes and said cathodes respectively.

10. In combination a first electric discharge path, a second electric discharge path, each path having an anode, a cathode and a control electrode, a transformer having a primary and a secondary, said secondary having end terminals and an intermediate terminal, load means, means connecting said cathodes to a common junction, means connecting said load means between said junction and said intermediate terminal, means connecting said anode of said first path to one end terminal, a rectifier, a capacitor, means connecting said other end terminal, said intermediate terminal, said rectifier and said capacitor in a charging circuit for said capacitor, said capacitor being charged with its plate electrically nearer said other end terminal positive, means connecting said anode of said second path to said plate, phase shift means connected between said control electrodes and said cathodes for impressing potential of opposite phase between said control electrodes and said cathodes respectively.

11. Apparatus for controlling the supply of power from a source of alternating current to a load comprising in combination a first electric discharge device, a second electric discharge device, each said device having an anode, a cathode and a control electrode, means connected to said anodes and cathodes for connecting said anodes and cathodes in anti-parallel between said source and said load, a transformer having a primary, a first secondary and a second secondary, means connecting said first secondary between said control electrode and cathode of said first device, means connecting said second secondary between said control electrode and cathode of said second device, and means connected to said primary for transmitting through said primary half cycles of current of one polarity only from said source.

12. A sequence timer for a high speed welder including normally open starting switch means to be closed and to remain closed during a welding operation including a plurality of welding cycles, means connected to said switch means and responsive to the closing thereof for timing a squeeze interval, the said timing means including a squeeze time-constant network including impedance means for extending the time interval timed by said network during the first of said welding cycles and normally open switch means connected to said impedance means for shunting out said impedance means, the said sequence timer also including means to be actuated for closing said last-named switch means, means connected to said squeeze interval timing means and responsive to the timing out of said squeeze interval for timing a hold interval, and means connected to said actuable means and responsive to the timing out of said hold interval for actuating said actuable means and for maintaining said actuable means actuated during the remainder of said welding operation.

13. A sequence timer for a high speed welder including normally open starting switch means to be closed and to remain closed during a welding operation including a plurality of welding cycles, means connected to said switch means and responsive to the closing thereof for timing a squeeze interval, the said timing means including a squeeze time-constant network including impedance means for extending the time interval timed by said network during the first of said welding cycles and normally open switch means connected to said impedance means for shunting out said impedance means, the said sequence timer also including means to be actuated for closing said last-named switch means, means connected to said squeeze interval timing means and responsive to the timing out of said squeeze interval for timing a hold interval, means connected to said actuable means and responsive to the timing out of said hold interval for actuating said actuable means, and means responsive to the actuation of said actuable means for connecting said actuable means to be maintained actuated through said starting switch means independently of said means responsive to the timing out of said hold interval.

14. A sequence timer for a high speed welder including normally open starting switch means to be closed and to remain closed during a welding operation including a plurality of welding cycles, means connected to said switch means and responsive to the closing thereof for timing a squeeze interval, the said timing means including a squeeze time-constant network including impedance means for extending the time interval timed by said network during the first of said welding cycles and normally open switch means connected to said impedance means for shunting out said impedance means, the said sequence timer also including means to be actuated for closing said last-named switch means, means connected to said squeeze interval timing means and responsive to the timing out of said squeeze interval for timing a hold interval, means connected to said actuable means and responsive to the timing out of said hold interval for actuating said actuable means, and means responsive to the actuation of said actuable means for connecting said actuable means to be maintained actuated through said starting switch means independently of said means responsive to the timing out of said hold interval.

15. A sequence timer for a high speed welder including normally open starting switch means to be closed and to remain closed during a welding operation including a plurality of welding cycles, means connected to said switch means and responsive to the closing thereof for timing a squeeze interval, the said timing means including a squeeze time-constant network including impedance means for extending the time interval timed by said network during the first of said welding cycles and normally open switch means connected to said impedance means for shunting out said impedance means, the said sequence timer also including means to be actuated for closing the said last-named switch means, means connected to said squeeze interval timing means and responsive to the timing out of said squeeze interval for timing a hold interval, an electric discharge device having an anode and a cathode, means connected to said device maintaining said device non-conducting, in the standby condition of said sequence timer, means connected to said device and to said hold interval timing means and responsive to the timing out of said hold interval for rendering said device conducting, means connecting said actuable means in circuit with said anode and cathode whereby when said device is conducting said actuable means is actuated, and means responsive to the actuation of said actuable means and connected to said starting switch means for maintaining said actuable means actuated independently of the conductivity of said device during the remainder of said welding operation.

16. In combination an electric discharge device having an anode, a cathode and a control electrode, capacitor means, impedance means, means connecting said impedance means between said control electrode and said cathode, rectifier means, means connecting in series said impedance means, said capacitor means and said rectifier means with said rectifier means poled to block current of a first polarity and to transmit current of a second polarity, means connected to said capacitor means for charging said capacitor means to said first polarity, and means connected to said capacitor means for discharging said capacitive means in a predetermined time interval when said capacitive means is charged to said first polarity and for thereafter charging said capacitive means to said second polarity.

17. In combination an electric discharge device having an anode, a cathode and a first control electrode, and a second control electrode, means connected to said anode and cathode for impressing a potential therebetween, a first time constant network, a second time constant network, said first network having a substantially shorter time constant than said second network, means connecting said first network to said first control electrode and said cathode, means connecting said second network between said second control electrode and said cathode, means connected to said first network for charging said first network to a potential such as to tend to render said device conducting, means connected to said second network for charging said second network to a potential maintaining said device non-conducting when said first network is charged as aforesaid, and means connected to said networks for causing both said networks to time out simultaneously whereby after said first network times out, said device is rendered conducting during the remaining interval during which said second network times out.

18. Apparatus for controlling the supply of power from a source of alternating current to a load comprising in combination a first electric discharge device, a second electric discharge device, each said device having an anode, a cathode and a control electrode, means connected to said anodes and cathodes for connecting said anodes and cathodes in anti-parallel between said source and said load, a transformer having a primary, a first secondary and a second secondary, means connecting said first secondary between said control electrode and cathode of said first device, means connecting said second secondary between said control electrode and cathode of said second device, an auxiliary electric discharge device having an anode and a cathode, means connected to said primary and said last-named anode and cathode for connecting said source to said primary through said anode and cathode with said last-named anode and cathode connected in rectifying relationship with said source and primary so that half cycles of only one polarity are transmitted from said source through said primary and said last-named anode and cathode and half cycles of the opposite polarity are suppressed by said last-named anode and cathode, and means for rendering said auxiliary device conducting during a selectively determinable number of periods of said source.

References Cited in the file of this patent
UNITED STATES PATENTS

| | | |
|---|---|---|
| 2,001,836 | Craig | May 21, 1935 |
| 2,001,837 | Craig | May 21, 1935 |
| 2,711,506 | Johnsen et al. | June 21, 1955 |
| 2,748,343 | Hartwig et al. | May 29, 1956 |
| 2,806,142 | Large | Sept. 10, 1957 |
| 2,806,197 | Rockafellow | Sept. 10, 1957 |